United States Patent Office 3,661,815
Patented May 9, 1972

3,661,815
WATER-ABSORBING ALKALI METAL CARBOXYLATE SALTS OF STARCH-POLYACRYLONITRILE GRAFT COPOLYMERS
Theodore Smith, Muscatine, Iowa, assignor to Grain Processing Corporation, Muscatine, Iowa
No Drawing. Filed May 18, 1970, Ser. No. 38,388
Int. Cl. C08b *25/02;* C08f *3/76, 27/14*
U.S. Cl. 260—17.4         12 Claims

ABSTRACT OF THE DISCLOSURE

Granular, water-insoluble alkali metal carboxylate salts of starch-acrylonitrile graft copolymers which are produced by saponifying starch-acrylonitrile graft copolymers with a base in an aqueous alcoholic medium.

---

This invention relates to novel compositions of matter having the ability to absorb or bind large amounts of liquids per part thereof.

Substances which are capable of absorbing relatively large amounts of fluids find numerous uses. For example, such substances can be used in manufacturing products such as disposable paper pads to increase the water absorbency of the pads. The greater the liquid absorbing capacity of such substances the less quantity need be employed, which, of course, is of importance from an economic or cost standpoint alone. It is therefore a principal object of this invention to provide novel compositions of matter possessing the ability to absorb large quantities of liquids per unit weight thereof.

Substances capable of absorbing liquids also find utility in the manufacture of products used to absorb body fluids such as diapers, sanitary napkins, protective bed pads and the like. The problem of absorbing body fluids is complicated by the fact that such fluids frequently contain enzymes which often exert an adverse effect on the fluid absorptive properties of the absorptive agents. It is therefore a further object of the invention to provide novel compositions of matter having the ability to absorb large amounts of body fluids per unit weight thereof without being adversely affected by enzymes present in the body fluids.

The novel compositions of this invention comprise alkali metal carboxylate salts of starch-polyacrylonitrile graft copolymers which are prepared by saponifying starch-polyacrylonitrile graft copolymers with an aqueous alcoholic solution of an alkali metal base. These novel products are uniquely characterized as being water-insoluble granular solids having the ability to absorb water in amounts in excess of 50 parts per part thereof while retaining their granular character.

Graft copolymers of starch-polyacrylonitrile per se are known as well as are methods for their preparation. Thus, it is known that acrylonitrile can be grafted on starch using ceric salts as catalysts to form starch-acrylonitrile graft copolymers. See, for example, U.S. Pat. No. 2,922,768. Such graft copolymers can also be prepared by the reaction of acrylonitrile with preirradiated starch which is prepared by irradiation of starch with gamma rays or an electron beam. See Reyes, Clark, Comas, Russell, and Rist, Nuclear Applications, 6, 509–517 (1969). In such graft copolymers the starch serves as a backbone or building block on which the acrylonitrile is grafted and therefore the starch need be present in only very small proportions with respect to the polyacrylonitrile moiety. For the purpose of this invention, the starch-polyacrylonitrile graft copolymer starting materials can be prepared by any of the known methods and the ratio of acrylonitrile to starch can be exceedingly high.

However, we prefer that the molar ratio of starch to acrylonitrile in the starting graft copolymers be at least 1:2 and generally in the range of 1:3 to 1:30.

Saponification of starch-polyacrylonitrile graft copolymers with aqueous solutions of bases such as potassium hydroxide is also known. For example, U.S. Pat. 3,425,-971 is directed to certain such saponified materials. The unexpected discovery forming the basis of the present invention is that saponification of starch-polyacrylonitrile or starch-polymethacrylonitrile graft copolymers with an aqueous alcoholic solution of a base provides products having significantly desirable and unexpected properties about which more will be said hereinafter. When reference is made herein to starch-polyacrylonitrile graft copolymers, it is to be understood that starch-polymethacrylonitrile polymers are likewise contemplated.

In accordance with this discovery, saponification of starch-polyacrylonitrile graft copolymers is effected using an aqueous alcoholic solution of an alkali metal base such as sodium hydroxide, lithium hydroxide or potassium hydroxide. Carrying out the saponification in an alcohol-containing medium is an essential and critical feature of this invention. The alcohols methanol or ethanol can be employed, methanol being preferred.

The saponification is conducted in any convenient manner whereby the starch-polyacrylonitrile graft copolymers are intimately contacted with the aqueous alcoholic solution of the saponifying base. The saponifying conditions can, of course, be varied in accordance with routine artisan skill. Nevertheless, the various parameters for conducting the saponification in accordance with the best mode of the invention now contemplated are as follows:

SAPONIFICATION CONDITIONS

|  | Practical operating range | Preferred |
|---|---|---|
| Temperature, ° C | 75–130 | 75–100 |
| Time, hours | 1–3 | 2–3 |
| Weight ratio of alcoholic saponifying solution to starch-acrylonitrile copolymer | 9–11 | 10–11 |
| Grams of base in 100 ml. of alcoholic saponifying solution | 5–10 | 5–7 |
| Grams of water in 100 ml. of alcoholic saponifying solution (when methanol is used) | 34–42 | 39–42 |
| Grams of water in 100 ml. of alcoholic saponifying solution (when ethanol is used) | 20–24 | 20–22 |

The following examples are further illustrative of the invention.

EXAMPLE 1

Preparation of starch-acrylonitrile graft copolymer

A slurry of ninety-seven grams of corn starch (dry solids basis) in 1330 milliliters of water was heated and purged with nitrogen while being stirred for one-half hour at 60° C.; then the mixture was cooled to 20° C. Acrylonitrile (97 grams; starch:acrylonitrile molar ratio of 1:3) and 70 milliliters of a ceric ammonium nitrate solution [molar/10 cerium ion in N/1 nitric acid ($HNO_3$)] were added in that order and the mixture was allowed to react for one hour at a temperature range of 20–50° C. The slurry was neutralized to a pH of 6–7 and filtered. The product was washed and then dried at 45° C. to a 3–5% moisture content.

EXAMPLES 2–6

In these examples, the procedure of Example 1 was followed to obtain products having starch:acrylonitrile molar ratios respectively of 1:1, 1:2, 1:4, 1:5 and 1:6. The nitrogen content and percent of theoretical yield of the products obtained are shown in Table I.

TABLE I

| Example: | Starch:AN, molar ratio | Percent N$_2$ | Percent yield [1] |
|---|---|---|---|
| 2 | 1:1 | 6.0 | 95.5 |
| 3 | 1:2 | 10.1 | 97.5 |
| 1 | 1:3 | 12.5 | 96.4 |
| 4 | 1:4 | 13.9 | 95.1 |
| 5 | 1:5 | 14.9 | ([2]) |
| 6 | 1:6 | 18.0 | 94.7 |

[1] Percent yield = weight of copolymer×100/(weight of starch plus weight of acrylonitrile).
[2] Not determined.

EXAMPLES 7-9

The starch slurry in Example 7 was pretreated before grafting by purging with nitrogen (N$_2$) for one hour at 25° C. In Examples 8 and 9, however, the starch slurries were treated similarly but for 30 minutes at 60 and 65° C., respectively. Data on the effect of these starch pretreatments are shown in Table II.

TABLE II

| Example: | Starch:AN, ratio | Pretreatment | Percent yield |
|---|---|---|---|
| 7 | 1:4 | 1 hour, 25° C | 92.7 |
| 8 | 1:4 | ½ hour, 60° C | 95.1 |
| 9 | 1:4 | ½ hour, 65° C | 92.0 |

These results show that pretreating the starch at 60° C. improves the percent yield by 2.5-3.0%. The 65° C. pretreatment produced a gelled product which was difficult to filter; the lower yield was due in part to partially soluble fractions which passed through the filter paper and settled out in the filtrate.

EXAMPLES 10-13

In these examples, the concentration of the cerium catalyst was varied from 4×10$^{-3}$ to 7.5×10$^{-3}$ moles per liter of grafting solution with the pretreatment as in Example 8. The data in Table III show that the catalyst concentration within the above range gives a good product yield of 95+%.

TABLE III

| Example: | Starch:AN, ratio | Concentration of cerium catalyst (X× 10$^{-3}$ M./liter) | Percent yield |
|---|---|---|---|
| 10 | 1:4 | 7.5 | 98.0 |
| 11 | 1:4 | 6.0 | 95.0 |
| 12 | 1:4 | 4.0 | 95.7 |
| 13 | 1:4 | 5.0 | 95.3 |

EXAMPLES 14-16

In Examples 14-16, the reaction time for polymerization was varied, 15, 30 and 45 minutes, under the conditions of Example 13 above. Table IV shows that grafting time increases product yield and percent nitrogen.

TABLE IV

| Example: | Time, minutes, grafting | Percent yield | Percent N$_2$ |
|---|---|---|---|
| 14 | 15 | 86.0 | 13.0 |
| 15 | 30 | 90.4 | 14.0 |
| 16 | 45 | 95.3 | 14.3 |

EXAMPLES 17-19

Waxy maize, tapioca starch, and potato starch were grafted with acrylonitrile under the conditions of Example 13. Tapioca and potato starch required lower pretreatment temperatures, however, because of their lower gelatinization temperatures. Data in Table V show the grafting results of these starches.

TABLE V

| Example: | Starch type [1] | Pretreatment temperature, ° C. | Percent yield | Percent N$_2$ |
|---|---|---|---|---|
| 17 | Waxy maize | 60 | 93.0 | 14.2 |
| 18 | Potato starch | 50 | 91.6 | 14.0 |
| 19 | Tapioca [2] | 53 | 93.0 | 13.9 |

[1] Starch:AN molar ratio, 1:4.
[2] Tapioca flour, special grade, Thailand.

EXAMPLE 20

Methacrylonitrile (MAN) was grafted to corn starch. This monomer required a higher temperature and a longer reaction time than was needed with acrylonitrile (AN). Table VI shows the conditions and results of grafting.

EXAMPLE 20

Table VI

| | |
|---|---|
| Starch:MAN molar ratio | 1:3 |
| Pretreatment temperature (one hour) | 60 |
| Reaction: | |
| Temp., ° C. | 40 |
| Time, hrs. | 5¼ |
| Percent yield | 83 |
| Percent N$_2$ | 13.4 |

EXAMPLES 21-23

When the grafted starch copolymers are saponified with an aqueous potassium hydroxide (KOH) solution the resulting products have relatively good liquid absorbing capacities but are subject to enzymatic attack when tested with urine. Three starch graft copolymers made with starch:acrylonitrile molar ratios of 1:4, 1:5 and 1:6 were saponified with aqueous KOH solutions following the procedure of Example 1 of U.S. Pat. 3,425,971. The starch graft copolymer (8 grams) was reacted with 80 milliliters of 10% KOH (10 ml./gram) in a glass flask at 80° C. for 2 hours. The reaction mixture was then blended with 225 milliliters of water and neutralized with 5 N hydrochloric acid (HCl) to a pH of 4.5. The resulting slurry was added slowly with stirring to 600 milliliters of methanol. The filtered product was washed with 100 milliliters of methanol (MeOH), and dried in a vacuum oven at 65° C.

The liquid take-up values (absorptive ability) of these products are shown in Table VII.

EXAMPLES 24-26

The starch graft copolymers used in Examples 21-23 were also saponified in aqueous-ethanolic-KOH solution. Four grams of starch graft copolymer (starch:AN molar ratio, 1:4) were allowed to react with a solution composed of 7.5 milliliters of water, 4 grams of KOH, and 32 milliliters of 95% ethanol at 75-80° C. (reflux conditions) for 2 hours. The product was isolated by neutralizing the excess KOH to a pH of 7.5 with glacial acetic acid, filtering, washing with ethanol, and vacuum drying at 60° C. for 5 hours. The data on the preparation and testing of the saponified products obtained in Examples 21-23 and 24-26 are tabulated in Table VII.

The products from aqueous-KOH and aqueous-ethanolic-KOH saponification were tested for their water or urine up-take by adding to one gram of product in a beaker, the maximum volume of liquid which gave no product paste flow when the beaker was inverted.

Thinning of urine-product paste is believed to be due to enzymatic action of amylase (in urine) on the carbohydrate (starch) fraction of the copolymer. It has been found that the products (urine paste) from Examples 21-23 which were made by aqueous-KOH saponification (prior art method) were thinned in 3-6 hours whereas products made with aqueous-alcoholic-KOH solutions in accordance with this invention, Examples 24-26, did not thin with urine even after 22 hours exposure; moreover, the latter products exhibited greater absorptive capacity for both water and urine.

TABLE VII

| | Starch:AN, molar ratio | Saponification | | Liquid up-take, ml./g. product | | |
|---|---|---|---|---|---|---|
| | | Aq. KOH | Aq. alcoholic KOH | Water | Urine | Thinning [1] |
| Example: | | | | | | |
| 21 | 1:4 | X | | 72 | 40 | (+) 3 hours. |
| 22 | 1:5 | X | | 58 | 25 | (+) 22 hours. |
| 23 | 1:6 | X | | 46 | 22 | (+) 6 hours. |
| 24 | 1:4 | | X | 84 | 45 | (−) 22 hours. |
| 25 | 1:5 | | X | 70 | 32 | (−) 22 hours. |
| 26 | 1:6 | | X | 86 | 36 | (−) 7 hours. |

[1] (+)—Positive thinning of urine-product paste; (−)—no thinning of urine-product paste.

EXAMPLES 27–34

The amount of water in the aqueous-alcoholic-KOH saponification mixture influences the liquid pick-up of the final saponified starch-acrylonitrile graft copolymer. One of two alcohols, ethanol or methanol, was used in the aqueous-alcoholic-KOH reaction mixture; the reaction was done in a Parr pressure bomb at temperatures of 75–129° C. for ½ to 2 hours. The reaction conditions and product testing data are shown in Table VIII.

EXAMPLES 35–38

In these examples the grafting and saponification were carried out in the same vessel without the intermediate recovery and purification of the graft copolymer. The grafting was done in the usual manner using the amount of water in the grafting step required for the subsequent saponification step. After the polymer was formed, potassium hydroxide (KOH) and methanol were added, and the saponification was carried out at 93–96° C. under

TABLE VIII

| | Percent KOH | Starch:AN, molar ratio | Grams of water/100 ml. of saponifying solution | Percent $N_2$ | Alcohol type | Temp., °C. | Liquid take-up, ml./g. | | |
|---|---|---|---|---|---|---|---|---|---|
| | | | | | | | Water | Urine | Thinning |
| Example: | | | | | | | | | |
| 27 | 7.0 | 1:4 | 21.3 | 3.6 | Ethanol | 79 | 84 | 41 | (−) |
| 28 | 6.9 | 1:4 | 21.3 | 4.3 | Methanol | 100 | 25 | 19 | (−) |
| 29 | 7.2 | 1:4 | 31.3 | 4.7 | do | 79 | 38 | 29 | (−) |
| 30 | 7.2 | 1:4 | 41.7 | 4.4 | do | 80 | 93 | 43 | (−) |
| 31 | 7.0 | 1:4 | 36.3 | 4.6 | do | 83 | 70 | 40 | (−) |
| 32 | 7.0 | 1:4 | 40 | 4.2 | do | 90 | 75 | 40 | (−) |
| 33 | 7.0 | 1:4 | 36.0 | 4.6 | do | [1] 100 | 59 | 32 | (−) |
| 34 | 7.0 | 1:4 | 36.0 | 3.7 | do | [2] 129 | 75 | 44 | (−) |

[1] Reaction time 30 minutes.
[2] Reaction time 50 minutes.

An increase in the water content from 21 to 42% in the aqueous methanolic-KOH mixture increases the liquid take-up of the starch-polyacrylonitrile product several fold. Methanol requires more water for saponification than does an ethanol system.

pressure in a closed reactor for two hours. The above procedure, i.e., grafting and saponifying in the same reactor, yields products with higher liquid take-up values than those of products prepared by a two-step preparation involving the isolation and drying of the intermediate starch-acrylonitrile copolymer. The reaction conditions and product testing results are shown in Table IX.

TABLE IX

| | Grafting | | | Saponification | | | Liquid up-take, ml./g. | | |
|---|---|---|---|---|---|---|---|---|---|
| | Starch:AN, molar ratio | Cerium, X×10$^{-3}$ M./liter | Percent solids | Grams water/100 ml. of saponifying solution | Percent $N_2$ | Percent yield [1] | Water | Urine | Thinning |
| Example: | | | | | | | | | |
| 35 [2] | 1:3 | 4.7 | 13.3 | 37.4 | 3.2 | 270 | 80 | 46 | (−) |
| 36 [2] | 1:3 | 7.5 | 12.5 | 41.8 | 3.2 | 274 | 105 | 55 | (−) |
| 37 [3] | 1:3 | 5.2 | 13.5 | 36.7 | 3.2 | 273 | 92 | 42 | (−) |
| 38 [2] | 1:4 | 7.5 | 12.5 | 40.5 | 3.9 | 330 | 105 | 47 | (−) |

[1] Percent yield = $\frac{\text{grams product} \times 100}{\text{grams starch}}$
[2] 7.0% KOH in saponification solution.
[3] 6.5% KOH in saponification solution.

The optimum water content in grams per 100 milliliters of saponification solution for methanol is about 39–42 and for ethanol is about 20–22.

EXAMPLES 39–43

The starch graft copolymers described in Examples 17–20 were saponified with an aqueous-alcoholic-KOH solution. Table X sets forth the saponifying conditions and the test results.

TABLE X

| | Starch-monomer | Percent KOH | Alcohol type | Grams water/100 ml. of saponifying solution | Liquid take-up, ml./g. | | |
|---|---|---|---|---|---|---|---|
| | | | | | Water | Urine | Thinning |
| Example: | | | | | | | |
| 39 | Waxy maize-AN [1] | 8 | Ethanol [3] | 24 | 92 | 50 | (−) |
| 40 | do.[1] | 7 | Methanol [3] | 37.5 | 114 | 55 | (−) |
| 41 | Potato-AN [1] | 8 | Ethanol [3] | 22.5 | 53 | 45 | (−) |
| 42 | Tapioca-AN [1] | 8 | do.[3] | 25.8 | 78 | 35 | (+) [4] |
| 43 | Corn-methacrylontirile [2] | 8 | do.[3] | 25.8 | 43 | 23 | (−) |

[1] Starch:AN molar ratio—1:4.
[2] Starch:Monomer molar ratio—1:3.
[3] Reaction conditions during saponification—Ethanol=Two hours at 75–78° C., refluxing; Methanol=Two hours at 93–96° C., in a Parr bomb.
[4] 6 hours.

EXAMPLES 44–45

Saponification of a graft copolymer (starch:AN molar ratio of 1:3) was done with an aqueous methanolic-sodium hydroxide (NaOH) solution. Table XI shows the testing results. The liquid absorption properties of the products obtained are similar to those of products obtained from the use of aqueous methanolic KOH. The products were stable to the enzymatic action of urine.

TABLE XI

| | Grams water per 100 ml. of saponification solution | Percent NaOH | Percent $N_2$ in product | Liquid take-up, ml./g. | | |
|---|---|---|---|---|---|---|
| | | | | Water | Urine | Thinning |
| Example: | | | | | | |
| 44 | 39.5 | 7 | 3.1 | 78 | 37 | (−) |
| 45 | 39.5 | 5 | 3.5 | 80 | 42 | (−) |

EXAMPLES 46–48

In Examples 46–48, starch:AN molar ratios of 1:1, 1:2 and 1:3 were employed. The starch-acrylonitrile copolymer products were saponified with aqueous ethanolic-KOH mixtures in a Parr bomb. Table XII gives data on the preparation and the testing of the products. As seen, an increase in the starch:AN molar ratio increases the liquid pick-up of the saponified products.

TABLE XII

| | Copolymer | | Saponification | | Liquid take-up, ml./g. | | |
|---|---|---|---|---|---|---|---|
| | Starch=AN, molar ratio | Percent $N_2$ | Percent KOH | Percent $N_2$ in product | Water | Urine | Thinning |
| Example: | | | | | | | |
| 46 | 1:0 | 6.0 | 6.9 | 2.0 | 28 | 20 | (+)[1] |
| 47 | 1:2 | 10.1 | 7.1 | 3.6 | 51 | 31 | (−) |
| 48 | 1:3 | 12.5 | 7.0 | 3.7 | 82 | 47 | (−) |

[1] 15 hours.

Those modifications and equivalents which fall within the spirit of the invention are to be considered a part thereof.

What is claimed is:

1. An alkali metal carboxylate salt of a starch-polyacrylonitrile graft copolymer or a starch-polymethacrylonitrile graft copolymer, said salt having been produced by saponifying a starch-polyacrylonirtile graft copolymer wherein the molar ratio of acrylonitrile to starch is at least 2:1 or a starch-polymethacrylonitrile graft copolymer wherein the molar ratio of methacrylonitrile to starch is at least 2:1 with an aqueous methanolic or aqueous ethanolic solution of an alkali base selected from the group consisting of sodium hydroxide, lithium hydroxide or potassium hydroxide, said alkali metal carboxylate salt being further characterized as a granular water-insoluble solid capable of absorbing in excess of 50 parts by weight of water per part thereof while retaining its granular characteristics.

2. An alkali metal carboxylate salt in accordance with claim 1 wherein the alkali metal is potassium.

3. An alkali metal carboxylate salt in accordance with claim 1 wherein the alkali metal is sodium.

4. An alkali metal carboxylate salt in accordance with claim 1 wherein the molar ratio of starch to acrylonitrile or starch to methacrylonitrile is about 1:3 to 1:30.

5. An alkali metal carboxylate salt in accordance with claim 1 wherein the molar ratio of starch to acrylonitrile or starch to methacrylonitrile is about 1:3 to 1:6.

6. An alkali metal carboxylate salt in accordance with claim 1 wherein an aqueous methanolic solution of an alkali base is employed in which the amount of water in said solution constitutes from about 34 to 42 grams per 100 milliliters of saponification solution.

7. An alkali metal carboxylate salt in accordance with claim 1 wherein an aqueous ethanolic solution of an alkali base is employed in which the amount of water in said solution constitutes from about 20 to 24 grams per 100 milliliters of saponification solution.

8. A process of preparing an alkali metal carboxylate salt of a starch-polyacrylonitrile graft copolymer wherein the molar ratio of acrylonitrile to starch is at least 2:1 or a starch-polymethacrylonitrile graft copolymer wherein the molar ratio of methacrylonitrile to starch is at least 2:1 which comprises saponifying said starch-polyacrylonitrile graft copolymer or said starch-polymethacrylonitrile graft copolymer with an aqueous methanolic or aqueous ethanolic solution of an alkali base consisting of sodium hydroxide, lithium hydroxide or potassium hydroxide.

9. A process in accordance with claim 8 wherein the alkali base is potassium hydroxide.

10. A process in accordance with claim 8 wherein the alkali base is sodium hydroxide.

11. A process in accordance with claim 8 wherein the saponifying solution comprises an aqueous methanolic solution of an alkali base in which the amount of water in said solution constitutes from about 34 to 42 grams per 100 milliliters of saponification solution.

12. A process in accordance with claim 8 wherein the saponifying solution comprises an aqueous ethanolic solution of an alkali base in which the amount of water in said solution constitutes from about 20 to 24 grams per 100 milliliters of saponification solution.

References Cited
UNITED STATES PATENTS
3,425,971   2/1969   Gugliemelli et al. _ 260—17.4 GC WILLIAM H. SHORT, Primary Examiner E. WOODBERRY, Assistant Examiner

UNITED STATES PATENT OFFICE
CERTIFICATE OF CORRECTION

Patent No. 3,661,815　　　　　　　　　Dated May 9, 1972

Inventor(s) Theodore Smith

It is certified that error appears in the above-identified patent and that said Letters Patent are hereby corrected as shown below:

Column 2, line 2 of the table, "Gime" should be -- Time -- line 3 of the table, "eight" should be -- Weight -- line 4 of the table, "Tstarch" should be -- starch -- line 5 of the table, "rams" should be -- Grams -- line 9 of the table, "Wused" should be -- used -- line 10 of the table, "rams" should be -- Grams -- line 11 of the table, "Gsaponifying" should be
-- Saponifying --

Column 3, line 29, "improfes" should be -- improves --

Column 5, in Table VIII, first line of the heading for column 4, after "Grams", "or" should be --of--

Column 6, Table IX, after Example numbers 35, 36 and 38 and in the footnote, change "2" to --(3)--

Table IX, after Example number 37 and in the footnote, change "3" to -- (2) --

Column 7, in Table XII, in the heading for column 2, "Starch:AN," should be -- Starch:AN -- in Table XII, first column of numbers after Example 46, "1:0" should be -- 1:1 -- in Table XII, the number "5" appearing before the footnote should be -- 1 --

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patent